United States Patent
Gross et al.

(10) Patent No.: US 7,801,650 B2
(45) Date of Patent: Sep. 21, 2010

(54) INFERRING THE ALTITUDE OF COMPUTING DEVICES USING MULTIVARIATE PATTERN RECOGNITION OF TELEMETRY SIGNALS

(75) Inventors: Kenneth C. Gross, San Diego, CA (US); Kalyanaraman Vaidyanathan, San Diego, CA (US)

(73) Assignee: Oracle America, Inc., Redwood City, CA (US)

( * ) Notice: Subject to any disclaimer, the term of this patent is extended or adjusted under 35 U.S.C. 154(b) by 1041 days.

(21) Appl. No.: 11/521,752

(22) Filed: Sep. 15, 2006

(65) Prior Publication Data

US 2008/0071433 A1    Mar. 20, 2008

(51) Int. Cl.
*G06F 19/00* (2006.01)
(52) U.S. Cl. .................. 701/14; 360/97.02; 701/4; 701/10
(58) Field of Classification Search .............. 701/14, 701/19, 3, 4, 5, 10; 702/186, 187; 703/25; 709/224; 710/19; 714/37, 39, 47; 360/69, 360/71, 73.03, 75, 97.02
See application file for complete search history.

(56) References Cited

U.S. PATENT DOCUMENTS

| 4,642,715 | A | * | 2/1987 | Ende ....................... 360/97.02 |
| 5,825,581 | A | * | 10/1998 | Morita et al. ............. 360/78.04 |
| 6,011,666 | A | * | 1/2000 | Wakamatsu ................. 360/69 |
| 6,067,203 | A | * | 5/2000 | Ottesen et al. ........... 360/73.03 |
| 6,824,362 | B2 | * | 11/2004 | Dodson, III ................ 417/22 |
| 2004/0263388 | A1 | * | 12/2004 | Krumm et al. ............. 342/451 |
| 2004/0264028 | A1 | * | 12/2004 | Ishii et al. .................... 360/69 |
| 2006/0291994 | A1 | * | 12/2006 | Bok et al. ..................... 415/47 |

* cited by examiner

*Primary Examiner*—Khoi Tran
*Assistant Examiner*—Stephen Holwerda
(74) *Attorney, Agent, or Firm*—Osha • Liang LLP

(57) ABSTRACT

A method for inferring an altitude of a computing device, involving monitoring variable data associated with a plurality of variables measured within the computing device, inferring the altitude of the computing device using the measured plurality of variables in a multivariate correlation function, and controlling operation of the computing device based on the inferred altitude.

24 Claims, 6 Drawing Sheets

INFERRING THE ALTITUDE OF COMPUTING DEVICES USING MULTIVARIATE PATTERN RECOGNITION OF TELEMETRY SIGNALS

CROSS-REFERENCE TO RELATED APPLICATIONS

The present application is related to U.S Pat. No. 7,020,802, filed on Oct. 17, 2002, entitled "Method and Apparatus for Monitoring and Recording Computer System Performance Parameters," the contents of which are incorporated by reference herein.

BACKGROUND

As computing devices, such as servers, disk drives, etc., continue to become increasingly more complex, with more transistors and logic gates on each chip, the various components of the computing devices become increasingly sensitive to cosmic rays (i.e., high energy particles that originate from the sun) and internally excited vibrations. In addition, such complex computing devices are more difficult to cool properly using air cooling techniques. For example, as disk drives increase in complexity, the disk drives become increasingly sensitive to vibration-induced destruction. Vibrations affect disk drives in this manner because the density of information stored on disk drives has grown exponentially, resulting in a write head that is required to hit a track that is less than 20 nanometers in width, while the write head is floating only 7 nanometers above the disk surface. Such a configuration makes the read and write performance of the disk drive very sensitive to internally excited vibrations, such as the vibrations that result from air cooling fans that intersect structural resonances within the computing device.

Further, complex computing devices are typically associated with soft error rates (SERs) from transient single-event upsets (SEUs). SEUs occur in both logic and memory chips and are typically due to high energy neutrons from cosmic rays. Because of increases in logic gate density and drops in voltage of successive generations of chips, the sensitivity of each new chip design with respect to neutron-induced SERs is also increasing.

The altitude of computing devices significantly affects the sensitivity and cooling of computing devices. For example, at higher altitudes, where the air is thinner, the blades of internal cooling fans turn faster (i.e., the fans have more revolutions per minute (RPMs)). This is because fan speeds are typically controlled by voltage, and are not locked into a fixed RPM. When fans operate faster, the vibrations created by the fans increases, which can lead to disk drive failures, as described above. Thus, often times, testing computing devices in a controlled enviromnent, such as a lab, at one altitude may not be sufficient to ensure that the computing devices will operate in the same manner upon being distributed to a field or data center at a customer site at a different altitude.

One way to obtain the altitude of a particular computing device is to install altimeter sensors that directly measure the altitude of the computing devices. In some cases, installing altimeter sensors for a large number of computing devices can become costly. Further, customers can specify the altitude for their location when configuration settings are obtained for computing devices that are specifically tested for the customers; however, many times, customers do not know this information or cannot obtain an accurate measure of the altitude at their specific location before the computing device is configured for the customer site.

SUMMARY

In general, in one aspect, the invention relates to a method for inferring an altitude of a computing device, comprising monitoring variable data associated with a plurality of variables measured within the computing device, inferring the altitude of the computing device using the measured plurality of variables in a multivariate correlation function, and controlling operation of the computing device based on the inferred altitude.

In general, in one aspect, the invention relates to a method for setting up the inference of altitude for a computing device, comprising pre-setting a plurality of altitude values for the computing device, obtaining variable data from a plurality of variables measured within the computing device at the plurality of altitude values, processing the variable data to obtain a uniform sampling rate for the variable data, constructing a multivariate correlation function using the plurality of altitude values and the variable data, wherein the multivariate correlation function is used to obtain an inferred altitude of the computing device when the computing device is in an execution environment, and wherein the inferred altitude is used to control operation of the computing device.

In general, in one aspect, the invention relates to an apparatus for inferring an altitude of a computing device, comprising a plurality of sensors for obtaining variable data for a plurality of variables within the computing device, and instructions stored on a medium readable by the computing device for causing the computing device to perform monitoring variable data associated with a plurality of variables measured within the computing device, inferring the altitude of the computing device using the measured plurality of variables in a multivariate correlation function, and controlling operation of the computing device based on the inferred altitude.

In general, in one aspect, the invention relates to a computing usable medium comprising computer readable program code embodied therein for causing a computer system to obtain variable data associated with a plurality of variables measured within the computer system, infer the altitude of the computer system using the measured plurality of variables in a multivariate correlation function, and control operation of the computer system based on the inferred altitude.

Other aspects of the invention will be apparent from the following description and the appended claims.

DETAILED DESCRIPTION

Figure 1:
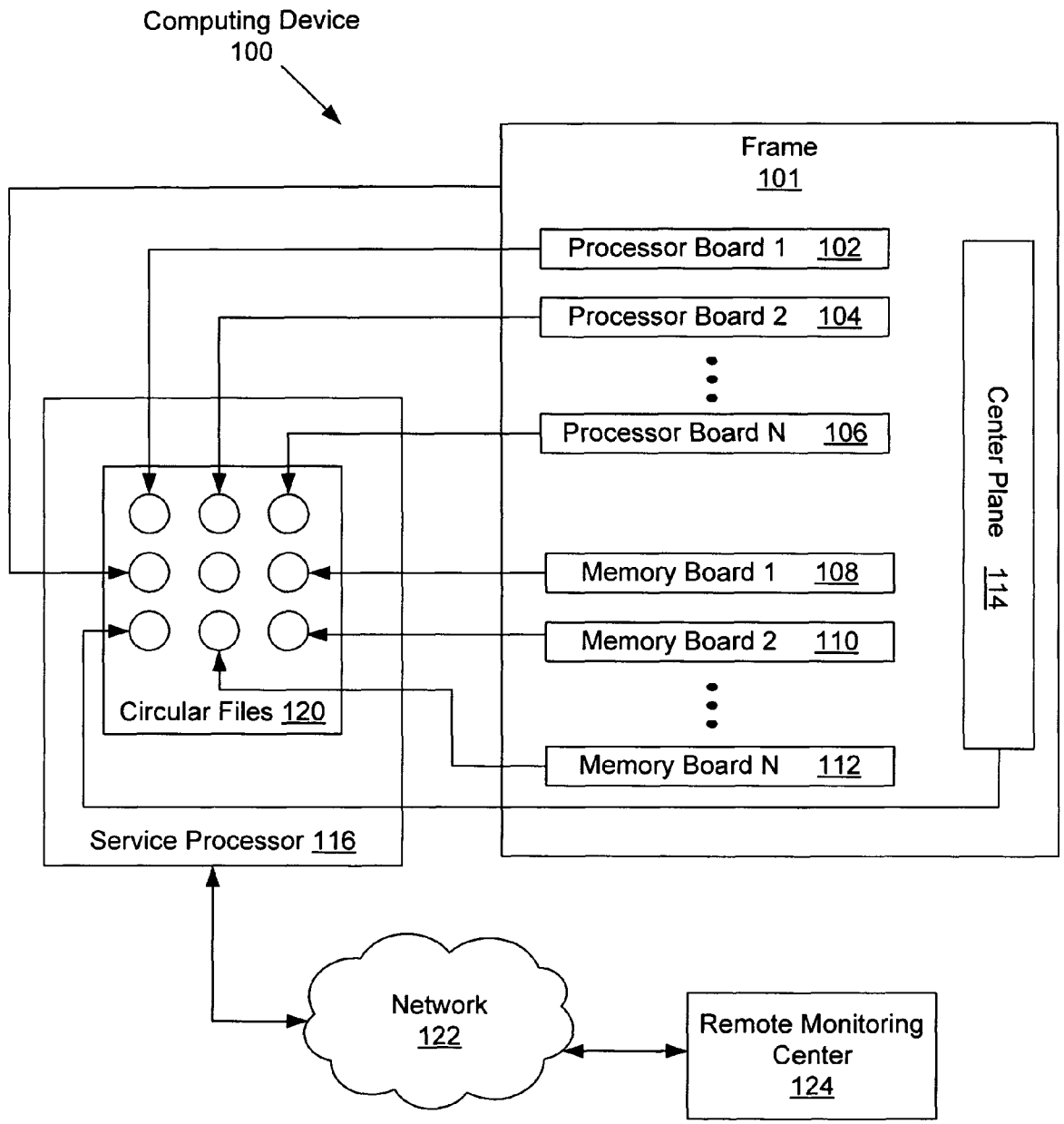
FIG. 1 shows a computing device in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for inferring the altitude of computing devices. Specifically, embodiments of the invention use a software telemetry harness and associated telemetric measurement data to infer the altitude of computing devices. More specifically, embodiments of the invention infer the altitude of computing devices using a nonlinear nonparametric regression function that predicts the altitude of computing devices based on the monitored values of remaining variables measured within the computing devices.

FIG. 1 shows a computing device (100) in accordance with one or more embodiments of the invention. The computing device (100) includes a frame (101), and a service processor (116). The frame (101) includes several processor boards (i.e., Processor Board 1 (102), Processor Board 2 (104), Processor Board N (106)), and several memory boards (i.e., Memory Board 1 (108), Memory Board 2 (110), Memory Board N (112)), and a center plane (114). The service processor (116) includes several circular files (120). Each of the aforementioned components of the computing device (100) is described below.

In one or more embodiments of the invention, the computing device (100) may be a server or any type of computing system, including a device controller, a personal organizer, a portable computing device, a mainframe computer, etc. The processor boards (102, 104, 106) within the computing device (100) communicate with the memory boards (108, 110, 112) through the center plane (114). The aforementioned components of the computing device (100) are housed within a frame (101). In one or more embodiments of the invention, all the components within the frame (101) are field replaceable units (FRUs) which are independently monitored as described below. In one or more embodiments of the invention, computing device (100) is operatively connected to a service processor (116). Those skilled in the art will appreciate that the service processor (116) may be located within the computing device (100), or may be a standalone unit external to the computing device (100).

In one or more embodiments of the invention, each FRU includes a sensor (not shown) for measuring one or more performance parameters associated with the computing device (100). The service processor (116) is configured to record the performance parameter(s) measured by each sensor within the computing device (100). More specifically, the service processor (116) records performance parameters measured by sensors on the FRUs into a set of circular files (120) located within the service processor (116). In one embodiment of the invention, one circular file (120) exists for each FRU within the computing device (100).

In one or more embodiments of the invention, the sensors and related circular files form a real-time telemetry harness, where the circular files serve as a repository for storing variable data associated with performance parameters measured within the computing device. Variable data may include measurement values for internal parameters maintained by software within the computing device (100), such as CPU load, transaction latencies, throughput, memory load, FIFO over-flow statistics, etc. Variable data also includes values associated with user wait times and other Quality of Service (QOS) metrics measured during the execution of transactions.

In addition, in one or more embodiments of the invention, variable data may include measured values associated with physical parameters measured via the aforementioned sensors located within the computing device (100). Such physical parameters include temperatures associated with various components within the computing device (100), relative humidity, cumulative or differential vibrations within the computing device, fan speed, acoustic signals, current noise, voltage noise, and other miscellaneous environmental variables. Further, in one or more embodiments of the invention, the telemetry harness includes functionality to convert physical parameter metrics into time series signals. The process by which performance parameters are measured, recorded, and converted into time series signals is detailed in U.S. Pat. No. 7,020,802, filed on, Oct. 17, 2002, the contents of which are incorporated by reference herein.

Continuing with FIG. 1, in one or more embodiments of the invention, the contents of each circular file may be transferred across a network (122) to a remote monitoring center (124) for diagnostic purposes. The network (122) may be a wired or wireless communication channel, such as, a local area network, a wide area network, the Internet, etc. The remote monitoring center (124) is configured to perform various diagnostic functions using the performance parameter data that is passed from circular files (120).

One or more embodiments of the present invention use variable data associated with internal software parameters and physical parameters measured by the aforementioned telemetry harness to infer the altitude of a computing device. More specifically, embodiments of the invention use a pattern recognition method called multivariate state estimation technique (MSET) to empirically "learn" the patterns of correlation among all the monitored telemetry signals. The monitored variable data is then used to predict the altitude of the computing device on the basis of the other correlated variables when the computing device is in an executed environment where the altitude is unknown.

Figure 2:
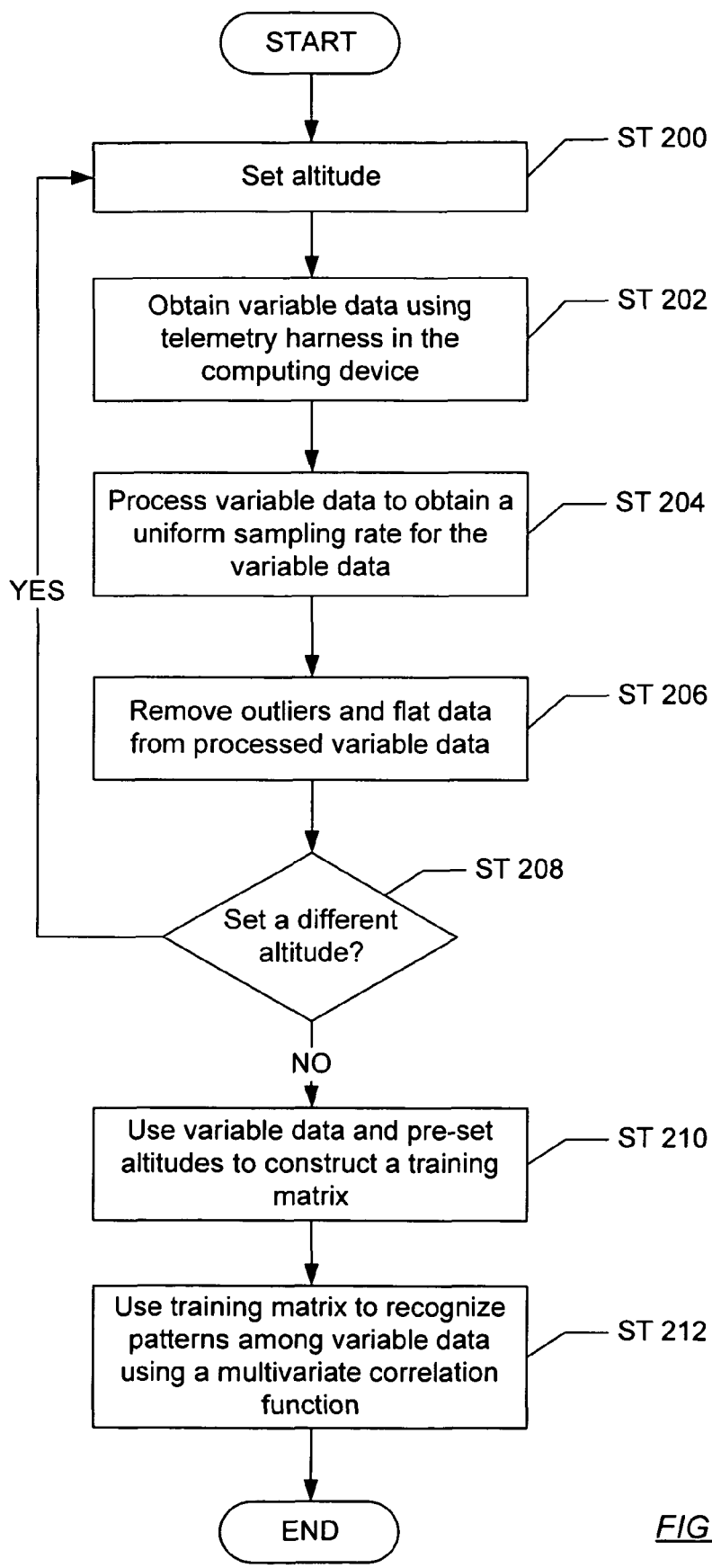
FIGS. 2-3 show flow charts for inferring the altitude of a computing device in accordance with one or more embodiments of the invention.

FIG. 2 shows a flow chart for setting up the ability to infer the altitude of computing devices in accordance with one or more embodiments of the invention. That is, FIG. 2 shows a training phase in accordance with one or more embodiments of the present invention, where one or more computing devices are set up for the ability to infer the altitude on the computing devices when the computing devices are deployed to the field or to datacenters in locations with varying altitudes.

Those skilled in the art will appreciate that other methods for pre-setting altitude values may be used. For example, the computing device may be placed in one or more locations with a known altitude. Alternatively, a training altimeter or other device for detecting the altitude may be used to determine the altitude at the location of the computing device in the training phase. In this case, the altimeter would be external to the computing device.

Referring to FIG. 2, initially, a desired altitude is set (Step 200). In one or more embodiments of the invention, the setting of various altitudes in the training phase may be performed in software, where a user simply enters a number for the desired altitude in the environmental chamber via a software program. Subsequently, variable data is obtained using the telemetry harness described with respect to FIG. 1 (Step 202). More specifically, in one or more embodiments of the invention, variable data associated with physical variables and soft variables is obtained using sensors within the computing device. Variable data obtained in Step 202 includes temperature measurements, voltage and current measurements, acoustic measurements, fan speed measurements, CPU load measurements, memory load measurements, disk I/O measurement, etc.

Further, in one or more embodiments of the invention, variable data is obtained in the training phase while varying the dynamics on CPU load within the computing device. For example, in one or more embodiments of the invention, CPU load may be varied from idle to full using a software script. CPU load dynamics, an internal parameter regulated by software, are varied in the training phase to obtain realistic physical parameter measurements. Because physical parameter measurements, such as temperature measurements, are directly affected by fluctuations in internal parameters, such as CPU load dynamics, varying the CPU load while obtaining variable data in the training phase allows variations in temperature measurements to be observed.

In one or more embodiments of the invention, the variable data is processed to obtain a uniform sampling rate for all the variable data (Step 204). Because telemetry signals (measurements) are collected from different collector processes executing within the computing device, the telemetry signals are usually not synchronized. For example, temperature measurements may be sampled at a different rate than fan speed measurements. Unsynchronized telemetry signals can be synchronized by resampling the signals so that all the variable data appears to have been sampled at exactly the same point in time.

In one or more embodiments of the invention, a uniform sampling rate is obtained for the variable data using analytical resampling. Particularly, analytical resampling receives a quantized signal, smoothes and resamples the quantized signal to produce a resampled signal. Subsequently, the resampled signal is re-quantized to produce a quantized resampled signal with uniform sampling rates. To re-quantize the signal, a probability distribution for the resampled signal is determined for a given point in time, using information corresponding to values of the resampled signal at neighboring points in time. The probability distribution is then used to probabilistically select a quantization level for the resampled signal for the given point in time, resulting in the quantized resampled signal. The aforementioned analytical resampling is performed for each telemetry signal to obtain a uniform sampling rate for the variable data.

Continuing with FIG. 2, outliers and flat data (i.e., data that exhibits no change and/or is unresponsive to changes in other variables) are removed from the variable data (Step 206). At this stage, a determination is made as to whether a different altitude needs to be set (Step 208). Said another way, if variable data for remaining pre-set altitude values needs to be obtained, then Steps 200-206 are repeated to obtain more variable data at various altitudes. For example, the aforementioned process may be repeated at sea level, 1000 feet above sea level, 2000 feet above sea level, etc. In one or more embodiments of the invention, the number of times the above described process is repeated may depend on the number of signals measured in the computing device and/or how many data points are needed to perform pattern recognition on the variable data (described below).

If the process does not need to be repeated at additional pre-set altitudes, then the obtained variable data at a uniform sampling rate is used to construct a training matrix (Step 210). In one or more embodiments of the invention, the training matrix includes a subset of the variable data on which pattern recognition is performed. For example, if 10,000 signals are obtained at various altitude values in the training phase, then 3000 of the observations may be used to construct the training matrix. In one or more embodiments of the invention, the training matrix may be any data structure capable of storing variable data in an organized form, such as arrays, tables, etc. In one or more embodiments of the invention, the training matrix is used to recognize patterns among the subset of variable data (Step 212). More specifically, in one or more embodiments of the invention, pattern recognition among the variable data stored in the training matrix is performed using a multivariate correlation function.

In one or more embodiments of the invention, the multivariate correlation function is a nonlinear nonparametric regression function that is applied to the variable data in the training matrix. When nonlinear nonparametric regression functions are applied to such variable data including measurement values for different variables, patterns and relationships among the different variables can be extracted. Said another way, non linear nonparametric regression analysis may be applied to empirically learn the correlation amongst several different variables (i.e., how one variable behaves in relation to one or more other variables). For example, in one or more embodiments of the invention, the multivariate correlation function applied to the variable data may be a Gaussian kernel function, a neural network, or any other nonlinear nonparametric regression function.

Those skilled in the art will appreciate that applying a nonlinear nonparametric regression function to a set of variable data to extract patterns and relationships among the different measured variables is a mathematical exercise that is well-known in the art. Thus, the explanation of applying a nonlinear nonparametric regression function to a set of variable data is omitted.

Figure 3:
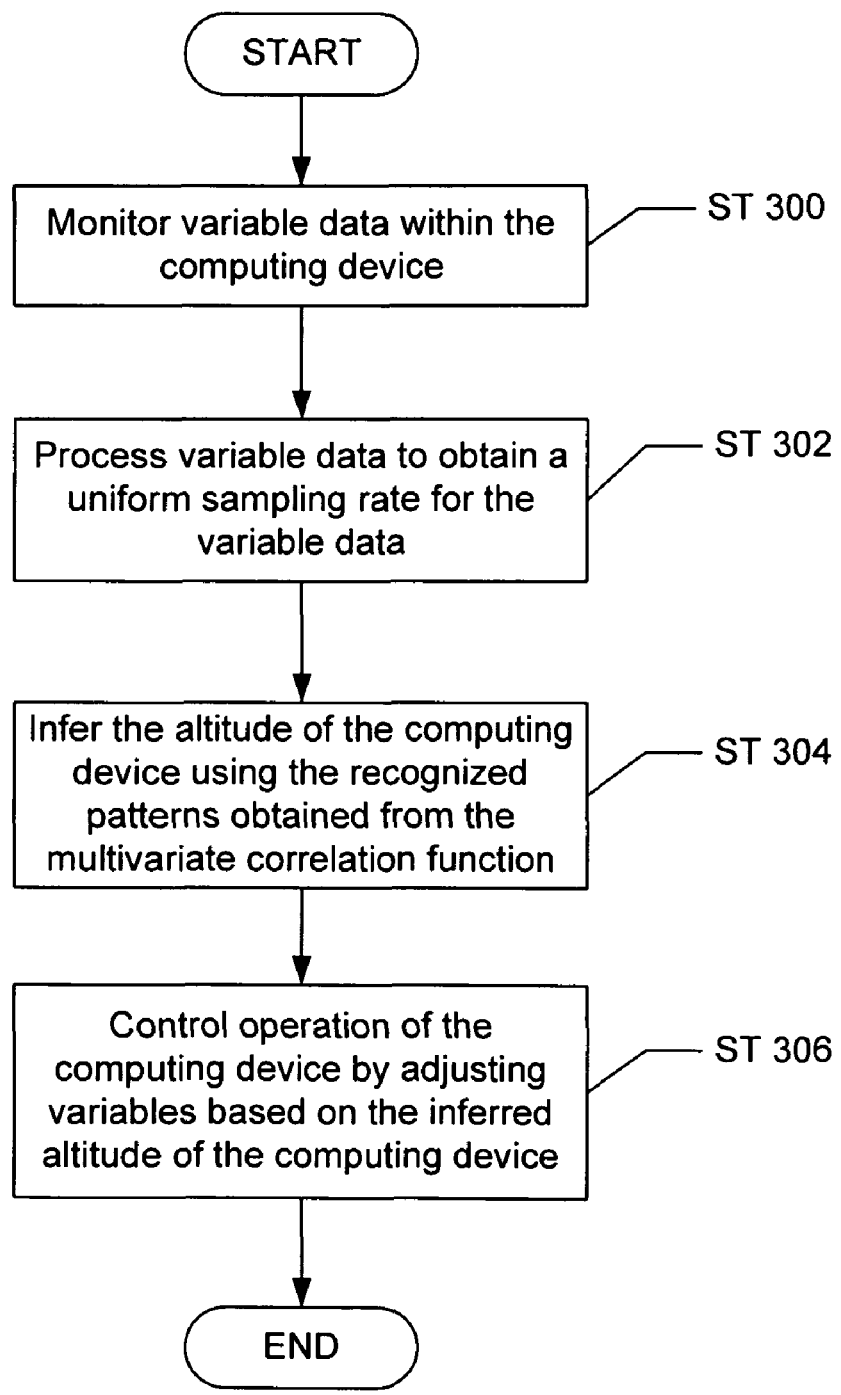

FIG. 3 shows a flow chart for inferring the altitude of computing devices in accordance with one or more embodiments of the invention. In one or more embodiments of the invention, FIG. 3 shows the process for inferring the altitude of a computing device when the computing device is deployed in a customer datacenter or in the field where the altitude is unknown. Further, in one or more embodiments of the invention, the process described in FIG. 3 builds on the training phase described in FIG. 2.

Initially, variable data within the computing device is monitored (Step 300). As described above, the variable data is collected using the telemetry harness of FIG. 1. Similar to the training phase, internal parameters, such as CPU load dynamics, may be varied when obtaining variable data in an execution environment. Thus, in one or more embodiments of the invention, CPU load dynamics may be varied from idle to full using a script while physical parameters are measured to obtain variable data.

Subsequently, the variable data is processed to obtain a uniform sampling rate for the variable data, using the analytical resampling method described above (Step 302). At this stage, in one or more embodiments of the invention, the altitude of the computing device is inferred (i.e., predicted) by examining the pattern recognition obtained from the multivariate correlation function applied to the variable data in the training phase (Step 304). More specifically, because the multivariate correlation function allows the prediction of one signal based on the behavior of all the other signals that were originally measured in the training phase, the altitude of the computing device can be inferred by observing and analyzing the other signals that are part of the variable data. Mathematically, if n signals were originally measured to obtain variable data, and the multivariate correlation function is applied to all n signals, then the inference of signal n can be performed using the monitored variable data for the remaining n−1 signals.

For example, suppose that the original signals used to obtain variable data included temperature measurements, current measurements, voltage measurements, fan speed measurements, and the pre-set altitude values. When the computing device is deployed to a customer site where the altitude is unknown, the temperature, current, voltage, and fan speed may be monitored to infer the value of the missing variable, i.e., the altitude.

Lastly, the inferred altitude is used to control the operation of the computing device (Step 306). Particularly, in one or more embodiments of the invention, the inferred altitude is used to adjust variables that affect the air-cooling, vibration activity, and other sensitivities within the computing device, which reduce the probability of disk drive failures and failures of other components of the computing device. For example, using the inferred altitude of the computing device, the fan speeds within the computing device may be adjusted to allow for the proper amount of air-cooling for the physical location of the computing device. Because fan speeds tend to increase in higher altitudes, if the computing device's inferred altitude is high, then the fan speed may be lowered to reduce the probability of vibrations from the fan affecting the operation of disk drives within the computing device. Further, in one or more embodiments of the invention, the inferred altitude is stored as one of the configuration parameters related to the execution environment of the computing device.

Figure 4A:
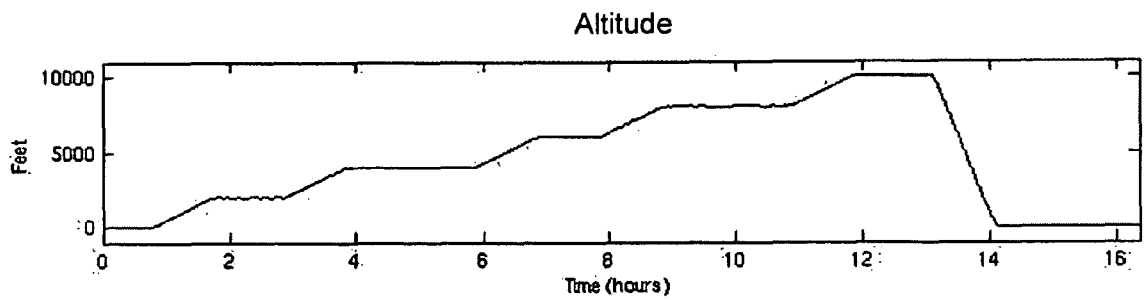
FIGS. 4A-4D show graphical examples of training data for inferring the altitude of a computing device in accordance with one or more embodiments of the invention.

FIGS. 4A-4D show examples of variable data obtained during the training phase in accordance with one or more embodiments of the invention. In particular, FIG. 4A shows a graph of the pre-set altitude values over a 16 hour period of time. As described above, the altitude may be monitored, for example, in an environmental chamber. The altitude shown in FIG. 4A varies from sea level (i.e., 0 feet above sea level) to 10,000 feet above sea level.

Figure 4B:
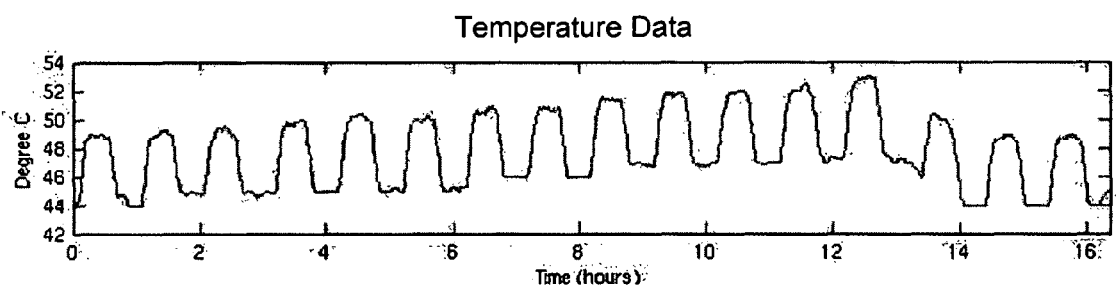
Figure 4C:
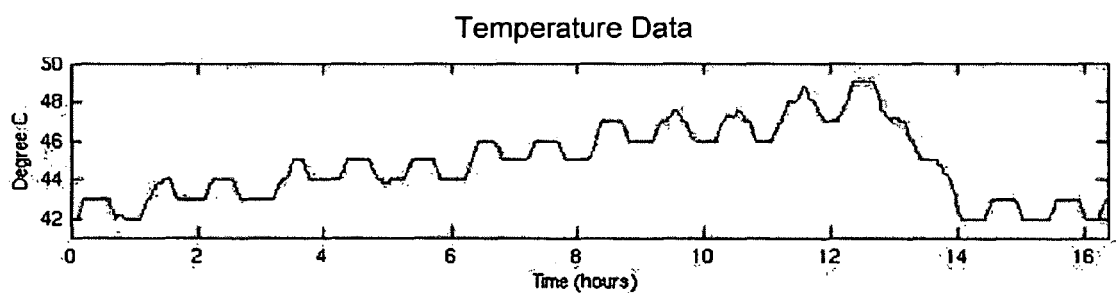
Figure 4D:
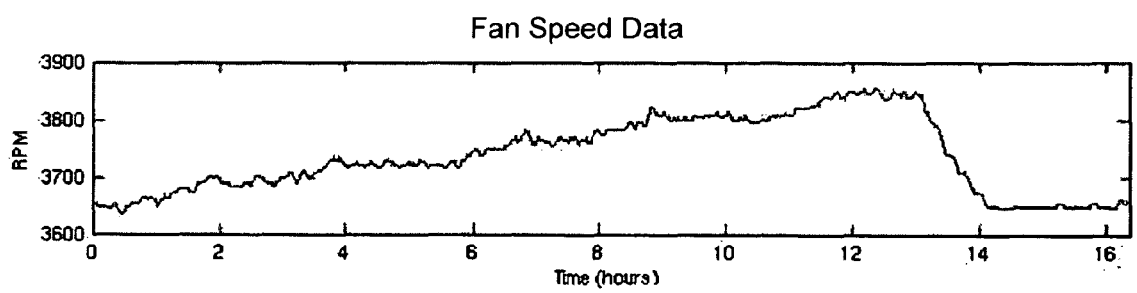

FIG. 4B shows temperature data plotted over a 16 hour time period in accordance with one or more embodiments of the invention. The temperature data is measured using a temperature sensor at the various altitudes shown in FIG. 4A. Further, in one or more embodiments of the invention, the fluctuation in temperature data shown in FIG. 4B results from dynamics imposed on CPU load. As described above, varying the dynamics on CPU load directly affects temperature measurements within the computing device. Similar to FIG. 4B, FIG. 4C shows a second set of temperature data measured over a 16 hour time period at the various pre-set altitude values in accordance with one or more embodiments of the invention. Lastly, FIG. 4D shows measurements obtained from a fan speed sensor within the computing device over a 16 hour time period in accordance with one or more embodiments of the invention. As can be seen from the variable data graphed in FIGS. 4B-4D, both temperature sensors and the fan speed sensor exhibit correlations to the changes in pre-set altitude values.

Figure 5A:
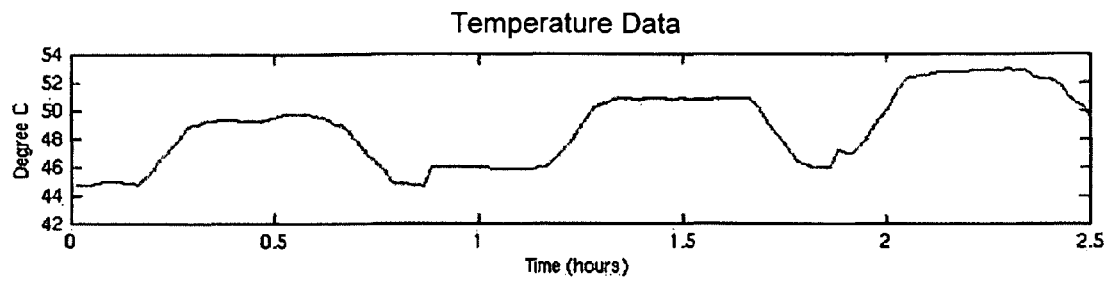
FIGS. 5A-5D show graphical examples of monitored data for inferring the altitude of a computing device in accordance with one or more embodiments of the invention.
Figure 5B:
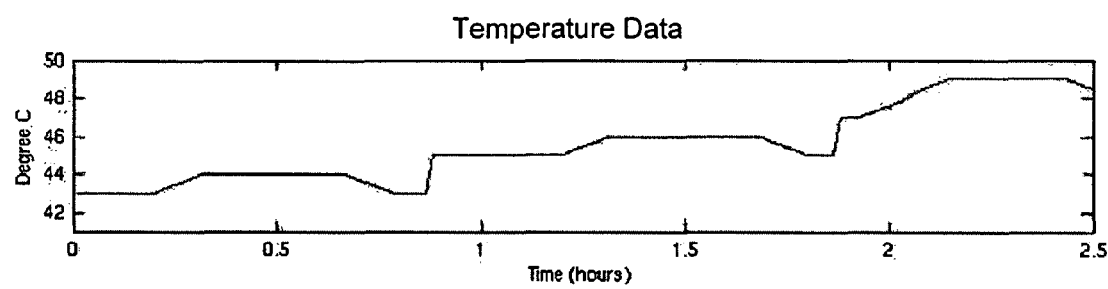
Figure 5C:
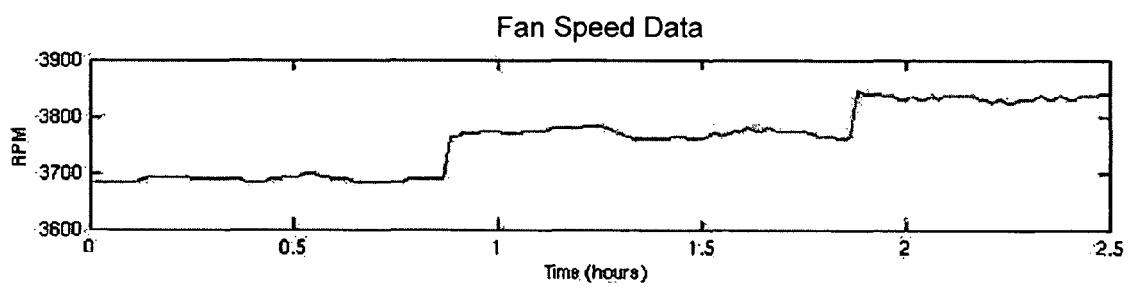

FIGS. 5A-5D show examples of monitored data when the computing device is in an execution environment in accordance with one or more embodiments of the invention. In one or more embodiments of the invention, FIGS. 5A and 5B show the temperature data measured using the same temperature sensor that is shown in FIGS. 4B and 4C, respectively. The temperature data graphed in FIGS. 5A and 5B is measured in the execution environment of the computing device. In one or more embodiments of the invention, the temperature data measured and shown in FIGS. 5A and 5B is graphed over a smaller period of time (i.e., 2.5 hours). In one or more embodiments of the invention, FIG. 5C shows the fan speed using the same fan speed sensor from which measurements were obtained in FIG. 4D.

Figure 5D:
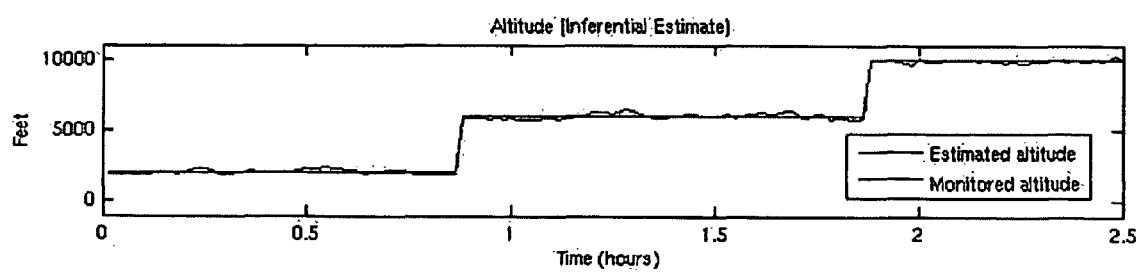

FIG. 5D shows a graph of the inferred altitude in accordance with one or more embodiments of the invention, where the inferred altitude is obtained using the multivariate correlation function and the process described above in FIG. 3. More specifically, using relationships and correlations between the monitored variable data represented in FIGS. 5A-5C, the altitude of the computing device is inferred and graphed in FIG. 5D. Further, the inferred altitude is plotted against the monitored altitude (i.e., the straight line graph) to show the accuracy of the inferred altitude. In one or more embodiments of the invention, the monitored altitude (i.e., the actual altitude of the location of the computing device when the computing device is in an execution environment), may be obtained using an altimeter or other altitude detecting device if a user wants to re-check the fidelity of the virtual altimeter modeling.

Figure 6:
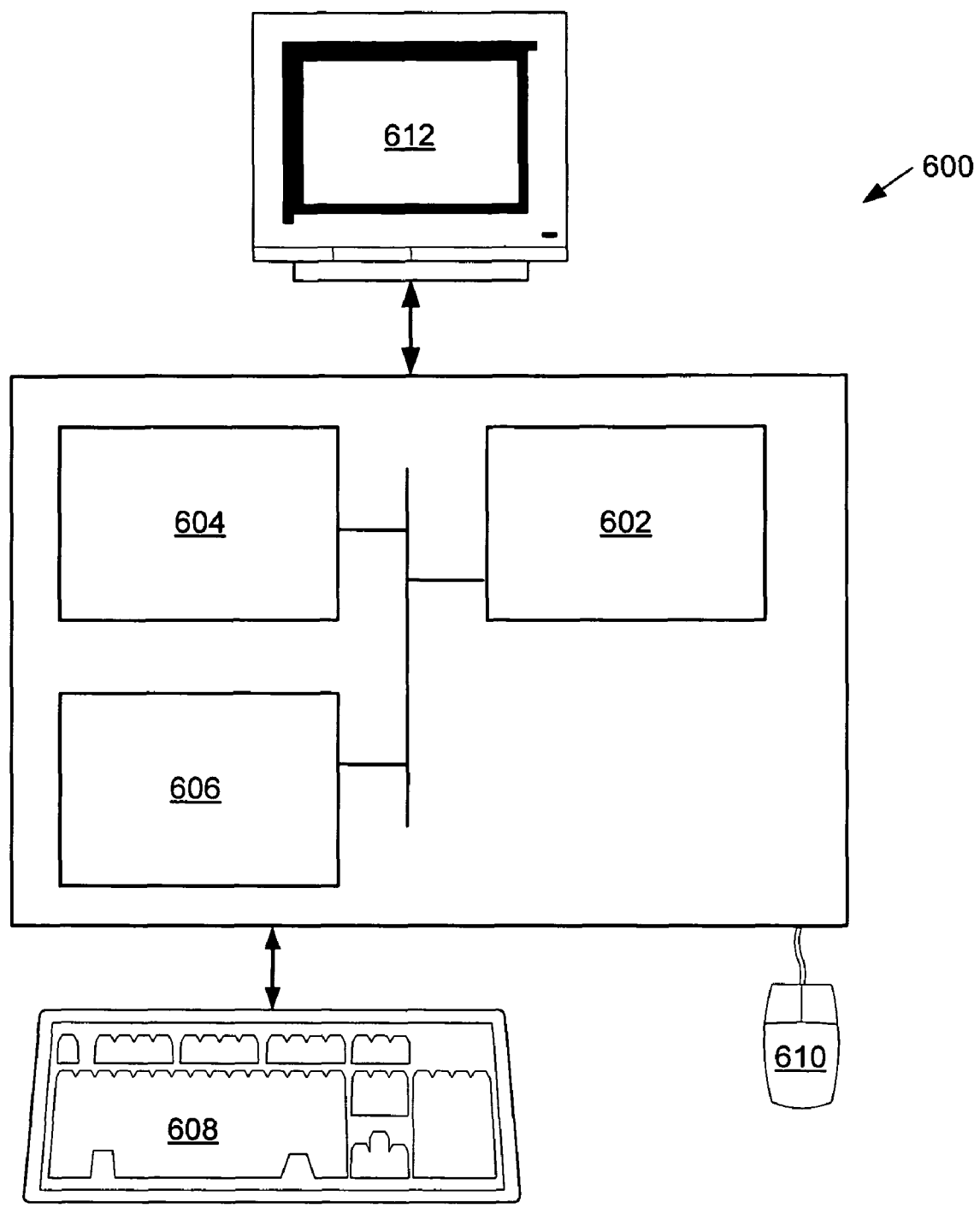
FIG. 6 shows a computer system in accordance with one or more embodiments of the invention.

The invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) is connected to a local area network (LAN) or a wide area network (e.g., the Internet) (not shown) via a network interface connection (not shown). Those skilled in the art will appreciate that these input and output means may take other forms, now known or later developed.

Further, those skilled in the art will appreciate that one or more elements of the aforementioned computer system (600) may be located at a remote location and connected to the other elements over a network. Further, the invention may be implemented on a distributed system having a plurality of nodes, where each computing device for which the altitude is inferred may be located on a different node within the distributed system. In one or more embodiments of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Embodiments of the invention provide a method and apparatus for inferring the altitude of a computing device that includes many signals (e.g., a computing device with a few signals up to 1000 or more signals being monitored using telemetry). By leveraging continuous system telemetry, embodiments of the invention provide for a method to infer the altitude of a computing device with +/−1% accuracy. Using the inferred altitude, operation of the computing device may be controlled. For example, air-cooling within computing devices may be optimized, soft error rate discrimination (SERD) may incorporate the altitude so that SERD may also be optimized, and automated fan speed adjustments can be made to avoid known structural resonances in computing device internal components. Optimizing the aforementioned variables reduces the probability of failure of a computing device that has been thoroughly tested in a training environment, but has not necessarily been tested in the execution environment of the computing device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for inferring an altitude of a computing device, comprising:
   monitoring variable data associated with a plurality of variables measured within the computing device;
   inferring the altitude of the computing device using the measured plurality of variables in a multivariate correlation function; and
   controlling operation of the computing device based on the inferred altitude,
   wherein controlling the operation of the computing device comprises adjusting at least one of a plurality of adjustable variables associated with the computing device based on inferred altitude, wherein the plurality of adjustable variables comprise a fan speed, a voltage, a current, and a temperature.

2. The method of claim 1, wherein the plurality of variables comprise physical variables including temperature signals, voltage signals, current signals, vibration signals, acoustic signals, and fan speeds measured within the computing device.

3. The method of claim 1, wherein the plurality of variables comprise internal variables including central processing unit (CPU) load, disk input/output, transaction latencies, throughput, and memory load.

4. The method of claim 1, further comprising:
   varying dynamics on a central processing unit (CPU) load.

5. The method of claim 4, wherein the CPU load is varied from idle to full.

6. The method of claim 1, further comprising:
   processing the monitored variable data to obtain a uniform sampling rate for the variable data.

7. The method of claim 1, wherein the multivariate correlation function is a non-linear, non-parametric regression function.

8. The method of claim 7, wherein the multivariate correlation function is one selected from the group consisting of a neural network and a kernel regression.

9. The method of claim 1, wherein the multivariate correlation function is used to determine relationships between the measured plurality of variables within the computing device.

10. A method for setting up the inference of altitude for a computing device, comprising:
    pre-setting a plurality of altitude values for the computing device;
    obtaining variable data from a plurality of variables measured within the computing device at the plurality of altitude values;
    processing the variable data to obtain a uniform sampling rate for the variable data;
    constructing a multivariate correlation function using the plurality of altitude values and the variable data,
    wherein the multivariate correlation function is used to obtain an inferred altitude of the computing device when the computing device is in an execution environment, and
    wherein the inferred altitude is used to control operation of the computing device,
    wherein controlling the operation of the computing device comprises adjusting at least one of a plurality of adjustable variables associated with the computing device based on inferred altitude, wherein the plurality of adjustable variables comprise a fan speed, a voltage, a current, and a temperature.

11. The method of claim 10, further comprising:
    removing outliers and flat data from the variable data.

12. The method of claim 10, wherein construction the multivariate correlation function comprises creating a training matrix comprising a subset of the variable data, and using the training matrix to determine relationships between the plurality of altitude values and the variable data within the computing device.

13. The method of claim 10, wherein the multivariate correlation function is a nonlinear nonparametric regression function.

14. The method of claim 10, wherein the plurality of variables comprise physical variables including temperature signals, voltage signals, current signals, vibration signals, acoustic signals, and fan speeds measured within the computing device.

15. The method of claim 10, wherein the plurality of variables comprise internal variables including central processing unit (CPU) load, disk input/output, transaction latencies, throughput, and memory load.

16. The method of claim 10, further comprising:
    varying dynamics on a central processing unit (CPU) load.

17. An apparatus for inferring an altitude of a computing device, comprising:
    a plurality of sensors for obtaining variable data for a plurality of variables within the computing device; and
    instructions stored on a medium readable by the computing device for causing the computing device to perform:
       monitoring variable data associated with a plurality of variables measured within the computing device;
       inferring the altitude of the computing device using the measured plurality of variables in a multivariate correlation function; and
       controlling operation of the computing device based on the inferred altitude,
       wherein controlling the operation of the computing device comprises adjusting at least one of a plurality of adjustable variables associated with the computing device based on inferred altitude, wherein the plurality of adjustable variables comprise a fan speed, a voltage, a current, and a temperature.

18. The apparatus of claim 17, wherein the variable data is obtained using telemetry.

19. The apparatus of claim 17, wherein the variable data is processed to obtain a uniform sampling rate for the variable data.

20. The apparatus of claim 17, wherein the plurality of variables comprise physical variables including temperature signals, voltage signals, current signals, vibration signals, acoustic signals, and fan speeds measured within the computing device.

21. The apparatus of claim 17, wherein the plurality of variables comprise internal variables including central processing unit (CPU) load, disk input/output, transaction latencies, throughput, and memory load.

22. The apparatus of claim 17, wherein the computing device is a server.

23. The apparatus of claim 17, wherein the multivariate correlation function is used to determine relationships between the measured plurality of variables within the computing device.

24. A computer usable medium comprising computer readable program code embodied therein for causing a computer system to:
  obtain variable data associated with a plurality of variables measured within the computer system;
  infer the altitude of the computer system using the measured plurality of variables in a multivariate correlation function; and
  control operation of the computer system based on the inferred altitude,
wherein controlling the operation of the computing device comprises adjusting at least one of a plurality of adjustable variables associated with the computing device based on inferred altitude, wherein the plurality of adjustable variables comprise a fan speed, a voltage, a current, and a temperature.

* * * * *